US006955278B2

(12) United States Patent
Lorscheidt

(10) Patent No.: US 6,955,278 B2

(45) Date of Patent: Oct. 18, 2005

(54) DISPENSER FOR PASTE-LIKE PRODUCTS

(75) Inventor: Willy Lorscheidt, Pulheim (DE)

(73) Assignee: Wilden AG, Regensburg (DE)

( * ) Notice: Subject to any disclaimer, the term of this patent is extended or adjusted under 35 U.S.C. 154(b) by 0 days.

(21) Appl. No.: 10/742,899

(22) Filed: Dec. 23, 2003

(65) Prior Publication Data

US 2004/0206781 A1 Oct. 21, 2004

Related U.S. Application Data

(63) Continuation of application No. PCT/EP02/04423, filed on Apr. 22, 2002.

(30) Foreign Application Priority Data

Jun. 29, 2001 (DE) .................................... 201 10 604 U

(51) Int. Cl.[7] ................................................ G01F 11/06

(52) U.S. Cl. ................. 222/320; 222/321.6; 222/321.7; 222/340

(58) Field of Search ................................ 222/378–380, 222/340, 386, 321.7, 321.9, 256–260, 207, 257, 384, 387, 383.1, 321.6, 320

(56) References Cited

U.S. PATENT DOCUMENTS

| | | | | | |
|---|---|---|---|---|---|
| 4,371,097 | A | | 2/1983 | O'Neill | |
| 4,515,298 | A | * | 5/1985 | Czech | 222/380 |
| 4,685,594 | A | * | 8/1987 | Czech | 222/182 |
| 4,856,679 | A | * | 8/1989 | Czech | 222/136 |
| 4,875,604 | A | * | 10/1989 | Czech | 222/257 |
| 4,890,773 | A | * | 1/1990 | Corsette | 222/380 |
| RE33,247 | E | * | 7/1990 | Bossina | 222/257 |
| 4,967,937 | A | | 11/1990 | von Schuckmann | |
| 5,152,434 | A | * | 10/1992 | Birmelin | 222/207 |
| 5,687,884 | A | | 11/1997 | Bodin et al. | |
| 6,013,270 | A | * | 1/2000 | Hargraves et al. | 424/401 |
| 6,158,625 | A | | 12/2000 | Siegel et al. | |

FOREIGN PATENT DOCUMENTS

| | | | |
|---|---|---|---|
| EP | 0230252 | A2 | 7/1987 |
| EP | 0686431 | B1 | 12/1995 |
| EP | 108304 | A1 | 3/2001 |

* cited by examiner

*Primary Examiner*—Frederick Nicolas

(74) *Attorney, Agent, or Firm*—Lawrence E. Laubscher, Sr.; Lawrence E. Laubscher, Jr.

(57) ABSTRACT

A dispenser includes an improved closure arrangement for sealing the dispenser in such a manner that oxidation of the paste-like product to be dispensed is avoided. The main headpiece is spring biased upwardly toward a first position relative to the container and to the product delivery piston, whereupon the upper end surface of the piston is spaced a given distance from the headpiece, and a cylindrical bearing surface on the headpiece closes the product supply outlets contained in the piston. When the main headpiece is depressed downwardly by the given distance toward an intermediate second position in which the headpiece engages the adjacent piston end surface, the bearing surface on the main headpiece is displaced downwardly to open the piston outlets. Upon further downward displacement of both the headpiece and the delivery piston toward a third position relative to the container, the paste-like product is pumped from the delivery chamber by the delivery piston for discharge via a main product outlet contained in the headpiece.

17 Claims, 10 Drawing Sheets

DISPENSER FOR PASTE-LIKE PRODUCTS

REFERENCE TO RELATED APPLICATION

This is a continuation of the PCT application No. PCT/EP02/04423 filed Apr. 22, 2002, based on the German priority Application No. 201 10 604.3 filed Jun. 29, 2001.

FIELD OF THE INVENTION

The present invention relates to a dispenser for paste-like products, the dispenser comprising a substantially cylindrical container which contains the paste-like product and which is equipped at the bottom side with a follower piston, which is slidingly displaceable on an inner wall of the container under pressure of the external atmosphere, and at its upper end carries a headpiece which is slidingly displaceable relative to the container and comprises a discharge channel for the product, which is connectable in communicating fashion to the container, and acts on a manually operable delivery means with a delivery chamber of a variable volume for the product

BRIEF DESCRIPTION OF THE PRIOR ART

Dispensers of this type are known as portable supply containers for use in numerous applications, such as body care applications, medical applications for dispensing medical compositions, or for the storage and sale of paste-like alimentary products. A corresponding variety of such dispensers is therefore available for containing paste-like products of widely varying nature, this diversification being particularly evident with regard to respective dispensing and operating mechanisms.

A dispenser of this type is e.g. known from EP-A-0 230 252. In this prior-art dispenser, the manually operable delivery means comprises a delivery piston by which the volume of the delivery chamber is variable. The delivery piston is locked with a pipe which is integrally formed on the headpiece. During use of the dispenser the headpiece is displaced from an initial position by manual operation in axial direction towards the container. This displacement movement directly leads to a sliding movement of the delivery piston along the inner wall of the delivery chamber with reduction of the volume thereof. The internal pressure built up in this process in the delivery chamber first effects an opening of a non-return valve which is formed in the delivery piston and elliptically covers a passage opening of the delivery piston and by which the paste-like product is then delivered with further reduction of the delivery chamber towards the discharge channel for withdrawal at a product discharge opening formed on the headpiece.

In the already known dispenser, an internal pressure for overcoming the closing forces of the non-return valve has first to be built up in the delivery chamber. The delivery of paste-like material through the non-return valve also leads to a loss in pressure, which is disadvantageous insofar as this requires the application of increased pressure forces for compensating said loss in pressure to axially displace the headpiece towards the container. Moreover, there is the problem that the product delivered through the non-return valve is present in those delivery portions of the dispenser that are arranged downstream of the non-return valve. Said delivery portions, however, are in constant communication via the product discharge opening with the surroundings, which may lead to an impairment of the paste-like products. Alimentary products are often affected by oxidation with respect to the quality of their flavor and color. Medical compositions may be impaired in their efficiency under the influence of air.

SUMMARY OF THE INVENTION

It is the object of the present invention to improve a dispenser of the above-mentioned type such that an operation with reduced operating forces is possible and that, moreover, impairment by oxidation of the paste-like product to be dispensed is avoided.

To achieve the above object, the dispenser of the above-mentioned type is developed with the present invention such that the delivery means comprises a delivery element which is longitudinally displaceable relative to the container and the headpiece and includes a delivery piston which is slidingly displaceable in the delivery chamber and is connected to a delivery shaft which circumferentially surrounds a delivery channel which comprises a delivery channel inlet opening communicating with the delivery chamber and a delivery channel outlet opening which can be brought by a displacement movement of the delivery element relative to the headpiece into a position in which the delivery channel outlet opening opens towards the discharge channel.

In the dispenser according to the invention, the delivery chamber opens towards the discharge channel via a delivery channel outlet opening which is released via a longitudinal displacement of the delivery element relative to the headpiece. This relative movement is preferably achieved in that the headpiece is manually operated, i.e. it is slidingly displaced in axial direction towards the container. The passage of the paste-like product from the delivery chamber to the product discharge opening at the end of the discharge channel is thus already released by a translational movement of the headpiece relative to the delivery element. A previous build-up in pressure in the delivery chamber, as was required in the generic prior art for releasing the passage, is not needed. Accordingly, the operating forces for discharging paste-like products from the dispenser are reduced.

In the dispenser according to the invention, a delivery channel is provided downstream of the delivery chamber, the delivery channel being surrounded by a delivery shaft. At the end of said delivery channel, the paste-like product discharged out of the delivery chamber is discharged by the delivery channel outlet opening into the discharge channel. It is only after the discharge of the product from the delivery channel outlet opening that the product is present in the discharge channel. The remaining discharge channel is at any rate shorter than in the generic dispenser. Accordingly, considerably less volume of the paste-like material is impaired by possible oxidation processes. The remaining residual length of the discharge channel can thereby be shortened, particularly in the case of products that are very prone to oxidation, in that the discharge channel opens outwards in an extension of the front side of the headpiece.

In an advantageous variant of the dispenser of the invention, the delivery channel outlet opening is recessed on the circumferential surface of the delivery shaft and a bushing which covers the delivery channel outlet opening in the initial position of the delivery means is provided on the headpiece so that upon a stroke movement of the headpiece for discharging paste-like material a release of the delivery channel outlet opening is easily achieved in that the delivery shaft is moved relative to the bushing. Said preferred variant is not only simple, but also permits an arrangement of the delivery channel outlet opening in direct vicinity of the inlet opening of the discharge channel for the product to be delivered.

In consideration of an easy axial guidance of the delivery means relative to the headpiece, the above-mentioned bushing is preferably designed as a guide bushing for the delivery means and has at least one guide surface cooperating with the circumferential surface of the delivery shaft.

With respect to an automatic closure of the delivery channel outlet opening upon the return movement of the headpiece into the initial position, it is suggested according to a preferred development of the present invention that entraining means should be provided on the headpiece and on the delivery means for entraining the delivery means after manual operation upon resetting of the headpiece into the initial position.

The above-mentioned entraining means are formed in a simple way preferably by an entraining shoulder which is formed on the bushing and cooperates with an entraining rim formed on the delivery shaft. Said entraining rim is preferably formed at the end side on the delivery shaft, so that the delivery channel outlet opening recessed below the entraining rim can be sealed in the initial position by contact of the entraining rim on walls of the headpiece.

In the aforementioned preferred variant, the volume present in the discharge channel can further be reduced by the measure that the entraining shoulder is formed at the end side on the bushing and at the transition to the discharge channel and the entraining rim in the front-sided end portion of the delivery shaft that is closed at the end side, as is suggested according to a preferred development of the present invention. In this preferred variant, the shaft cap arranged at the end side on the delivery shaft is substantially flush with the discharge channel in the initial position of the delivery means and preferably comprises the entraining rim.

According to a preferred development of the present invention, the delivery piston is operated preferably via the front faces of the guide bushing at the end side. In this preferred development, the delivery piston projects radially over the delivery shaft for forming an annular contact surface for a pressure surface that is formed at the front side on the guide bushing and is arranged in the initial position at an axial distance relative to the contact surface and can be brought into contact with the contact surface by axial displacement of the headpiece towards the container.

Also in consideration of a constructional simplification it is suggested according to a further preferred design of the present invention that the inner wall of the delivery chamber should be formed by an inner sleeve provided on the front side of the container at the headpiece side. The inner sleeve projects beyond the front side of the container at the side facing the headpiece. Preferably, the inner sleeve is integrally formed on the container for reducing the components.

For an easy centering of the headpiece during assembly of the dispenser and for an easy mounting of the headpiece on the container, a preferred development of the present invention suggests a mating headpiece that comprises a holding cylinder put over the aforementioned inner sleeve in the manner of a cup, and a guide cylinder which is arranged concentric to the holding cylinder and guides the slide displacement of the headpiece. The guide cylinder and/or the holding cylinder permit an easy concentric alignment of the headpiece relative to the cylinder. Furthermore, the guide cylinder improves the guiding of the stroke movement of the headpiece during operation of the dispenser.

In a further preferred variant of the dispenser according to the invention, where the end of the guide cylinder at the delivery chamber side forms a delivery piston stop for the delivery piston, a relatively elongated guide for the delivery piston is provided on the one hand and a stroke limitation of the delivery piston in a simple way on the other hand. Such a stroke limitation retains e.g. the headpiece in the initial position on the container when the entraining means are in operative communication.

Preferably, the holding cylinder comprises an annular shoulder at the bottom side, which forms a contact surface for a coil spring which holds the headpiece in the initial position under bias. This offers the advantage that the outer circumferential surface of the holding cylinder surrounds the coil spring on the inside and thus prevents a bending of the spring. The annular shoulder is mounted in this preferred variant at the front side of the container and is thus particularly suited for fixing the mating headpiece in axial direction relative to the container.

According to a further and particularly preferred variant, the mating headpiece and the headpiece are designed as prefabricated dispenser components. In this instance, the headpiece and the mating headpiece are particularly preferably slid over one another with their outer lateral surfaces, each in the manner of a cup, the mating headpiece comprising at least one stop for defining the axial displacement movement of the headpiece relative to the mating headpiece. In such a variant, the inner chamber surrounding the lateral surfaces has preferably positioned therein a restoring element, e.g. the above-mentioned coil spring, which biases the headpiece and the mating headpiece in axial direction in spaced-apart relationship. The aforementioned stop defines the axial displacement movement of the headpiece, i.e., after assembly of headpiece and mating headpiece, including the spring, it ensures coherence of the two mutually displaceable components. The dispenser component formed in this way can be put on differently designed containers, which permits an economic production of the dispenser for very different applications and container volumes.

A particularly simple and lasting connection is established between the prefabricated dispenser component and the container in that the dispenser components are locked with the container via locking means formed on the mating headpiece and the front side of the container.

Preferably, in the dispenser according to the invention, the headpiece is longitudinally displaceable such that the headpiece can be brought by manual operation from the initial position first by a first axial distance for contact with the delivery piston with simultaneous exposure of the delivery channel outlet opening in the discharge channel into a central position and the headpiece can then be brought with a progressive axial displacement with entrainment of the delivery piston from the central position into a discharge end position in which the delivery chamber has reached its minimum volume by displacement of the delivery piston. In this preferred variant, the delivery channel outlet opening is exposed and the substance is compressed in the delivery channel within the scope of an equidirectional movement of the headpiece towards the container. This preferred variant permits a constructionally simple solution of the dispenser according to the invention, wherein the headpiece acts directly on the delivery piston and drives it after exposure of the delivery channel outlet opening for delivering paste-like material. This movement of the headpiece is normally carried out against the force of a biasing element, such as a spring, which ensures that upon unloading of the headpiece said piece presses from the discharge end position away from container. During this movement the axial distance a is first covered, i.e. the delivery channel outlet opening is closed again. During this closing movement a relative movement takes place between the delivery shaft and the discharge channel in which the volume of the discharge channel is enlarged at the inlet thereof. As a result, the paste-like material contained in the discharge channel is pulled back towards the pump chamber, i.e. away from the product discharge opening of the discharge channel in the headpiece.

According to another embodiment of the invention, a closure member is positioned on said product discharge opening. The closure member is preferably of such a configuration that it opens due t a pressure difference between the discharge channel and the atmosphere for discharging the paste-like product. When, as has been mentioned above, the paste-like material is pulled back in the discharge channel away from the product discharge opening, this leads to a relative vacuum in the discharge channel, which ensures that the closure member seals the product discharge opening in a particularly efficient way.

With respect to a sealing that is as tight as possible, it is preferred when the product discharge opening is formed around a closure mandrel arranged in the discharge channel. This closure mandrel is preferably integrally formed on the headpiece. The closing member, which is also made annular, comprises a sealing lip that can sealingly be placed on the closure mandrel and efficiently closes the discharge channel in the case of an effective vacuum, but upon discharge of the paste-like product releases a relatively large product discharge opening through which the product can be discharged with relatively little loss in pressure.

A highly efficient closure member can be formed in a particularly economic way by means of bicomponent injection molding on the head member, as is suggested according to a preferred development of the present invention. In this variant, the closure member is firmly connected to the headpiece. Preferably, the closure member is formed from a flexible plastic material, particularly preferably from a thermoplastic elastomer. It has been found that an efficient sealing of the product discharge opening can be achieved with a thermoplastic elastomer.

It has been found that the material for the sealing member can be used particularly preferably for forming a functional surface on the outer surface of the headpiece at the front side. Such a functional surface may e.g. be a pusher surface which improves the haptic properties and against which the user of the dispenser presses during its use. Such a functional surface is preferably formed by a coating at least at the front side on the outside of the headpiece. The closure member and the coating are made integral, preferably by means of a bicomponent injection molding operation following the technical injection molding production of the headpiece.

BRIEF DESCRIPTION OF THE DRAWINGS

Further details, advantages and features of the present invention will become apparent from the following description of an embodiment when taken in conjunction with the drawing, in which.

DETAILED DESCRIPTION

Figure 1:
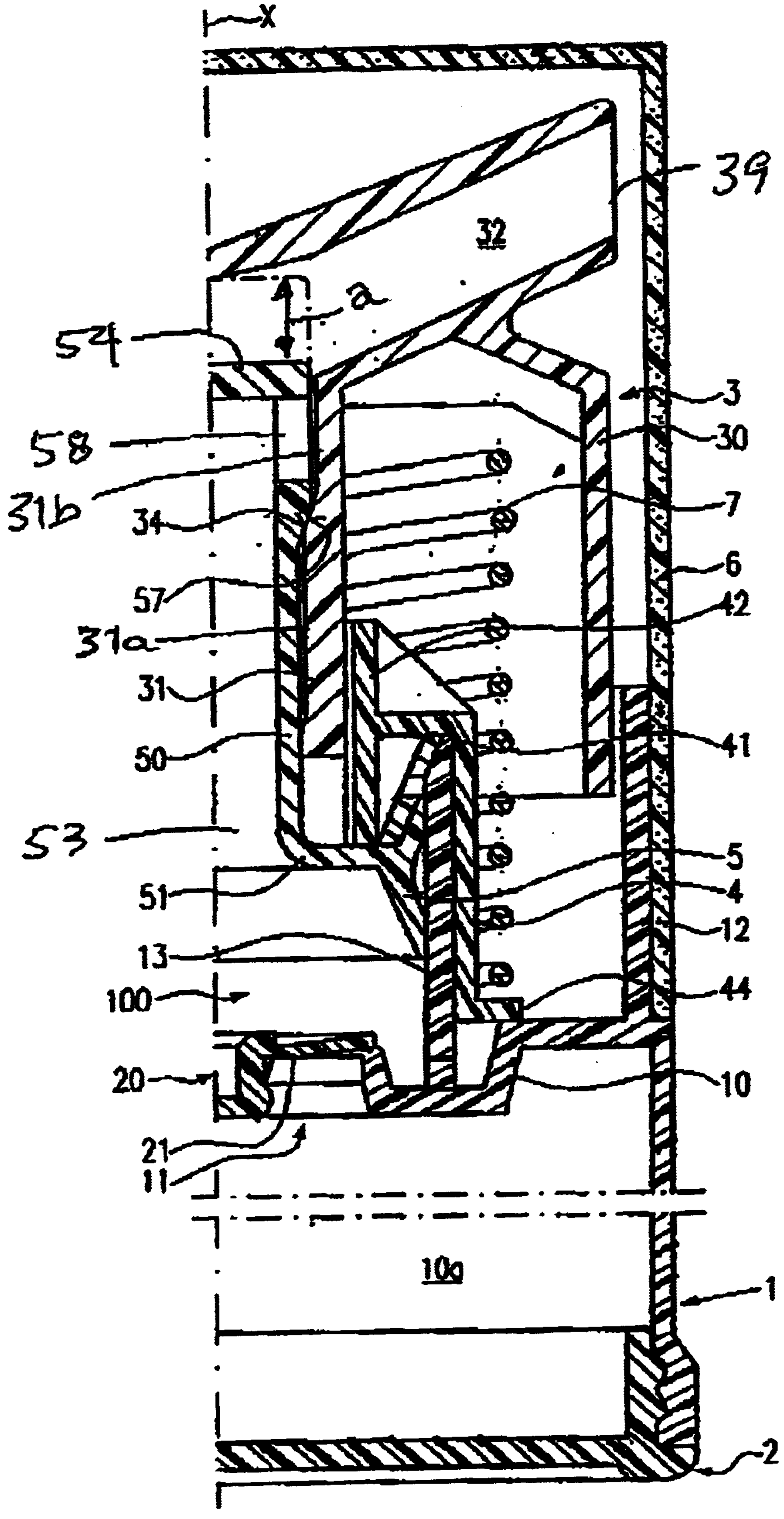
FIG. 1 is a longitudinal sectional view of a first embodiment of a dispenser according to the invention.

The embodiment of a dispenser of the invention as shown in FIG. 1 comprises a container 1 which is cup-shaped and is connected at its bottom side to a bottom plate 2 which is locked with the container 1. At its other front side, the container 1 comprises a head-sided cover portion 10 in which a container opening 11 is recessed. The cover 10 is configured at the side facing away from the container 1 such that it receives a dispenser head consisting of a headpiece 3, a mating headpiece 4 and a pressure piston 5. Furthermore, the dispenser comprises a closure cap 6 slid onto an outer sleeve 12 of the container 1 which extends above the cover 10. The container 1, the bottom plate 2, the mating headpiece 4 and the pressure piston 5 are configured as rotation-symmetrical components and arranged concentric to a central longitudinal axis X. The headpiece 3 and the mating headpiece 4 have positioned thereinbetween a coil spring 7 (shown schematically) by which the headpiece 3 is held in a biased condition relative to the mating headpiece 4 in the initial position shown in FIG. 1.

The headpiece 3 comprises a cylindrical outer casing 30 which is arranged radially inside directly adjacent to the outer sleeve 12 of the container portion 10 and in concentric fashion thereto. The outer sleeve 12 projects in axial direction over the end of the outer casing 30 at the container side. Accordingly, the embodiment of the dispenser as shown in FIG. 1 also appears in the removed state of the closure cap as a closed unit consisting of the container 1 and the headpiece 3. As will be explained in more detail hereinafter, the headpiece 3 and the pressure piston 5 are held in longitudinally displaceable fashion relative to other container 1, the pressure piston 5 being additionally displaceable in longitudinal direction relative headpiece 3.

Figure 2:
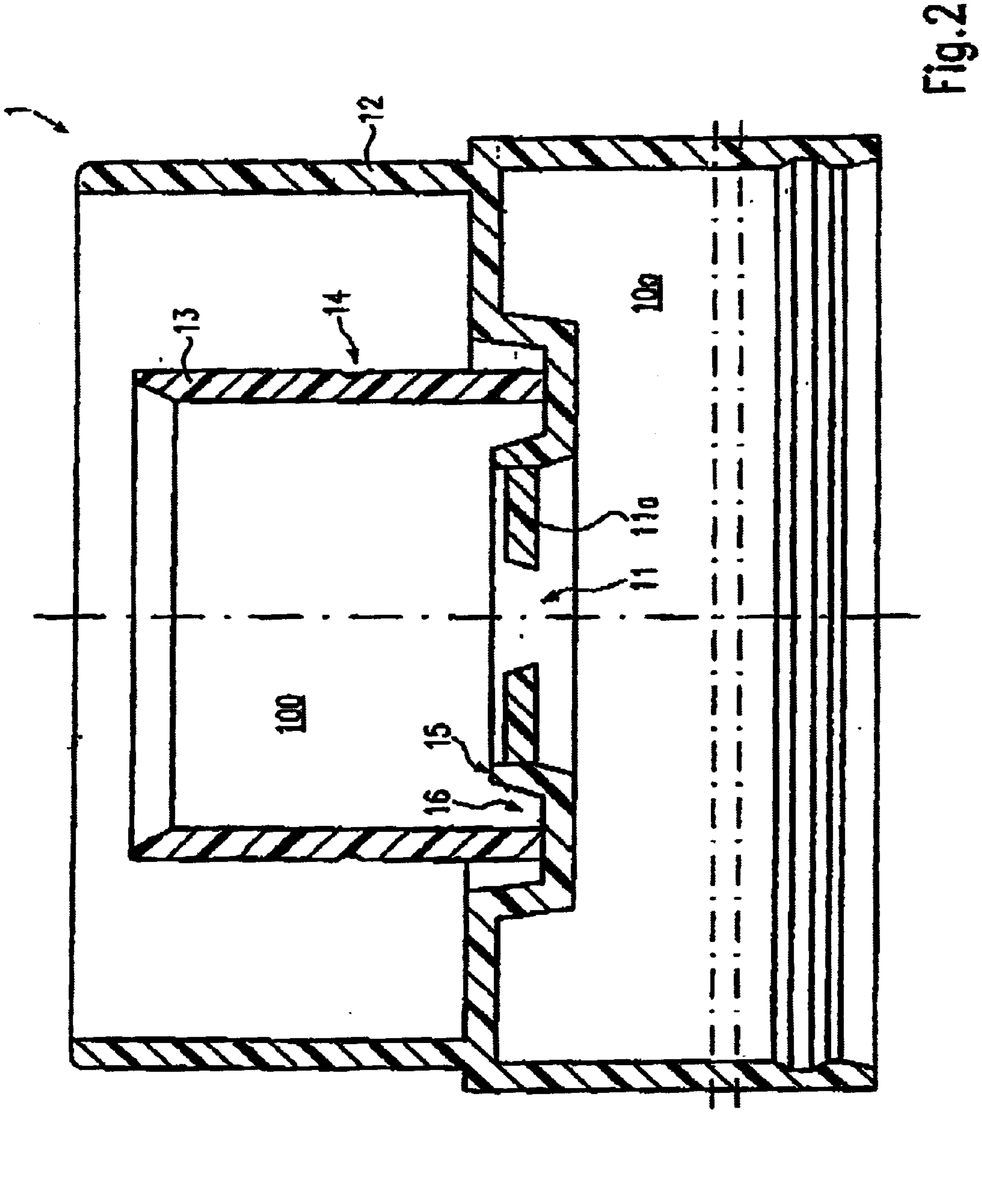
FIG. 2 is a longitudinal sectional view of the container of the embodiment shown in FIG. 1.

FIG. 2 is a longitudinal sectional view of the container 1. The cylindrical wall of the container 1 encloses an inner chamber 10*a* for receiving the paste-like product. Holding webs 11*a* which are oriented in star-shaped configuration extend in the container opening 11. At the side of the cover 10 that faces away from the inner chamber 10*a*, a cylindrical inner sleeve 13 is arranged concentric to the container opening 11, the inner sleeve 13 being projected over in axial direction by the outer sleeve 12 and surrounding a delivery chamber 100. The inner wall of the inner sleeve 13 is smooth, whereas a surrounding locking groove 14 is recessed on the outside of the inner sleeve 13. The bottom of the delivery chamber 100 is formed by the cover 10 of the container 1. The cover 10 comprises an annular rim 15 which projects into the delivery chamber 100 and which surrounds the container opening 11 and forms an annular gap 16 between itself and the inner sleeve 13.

Figure 3:
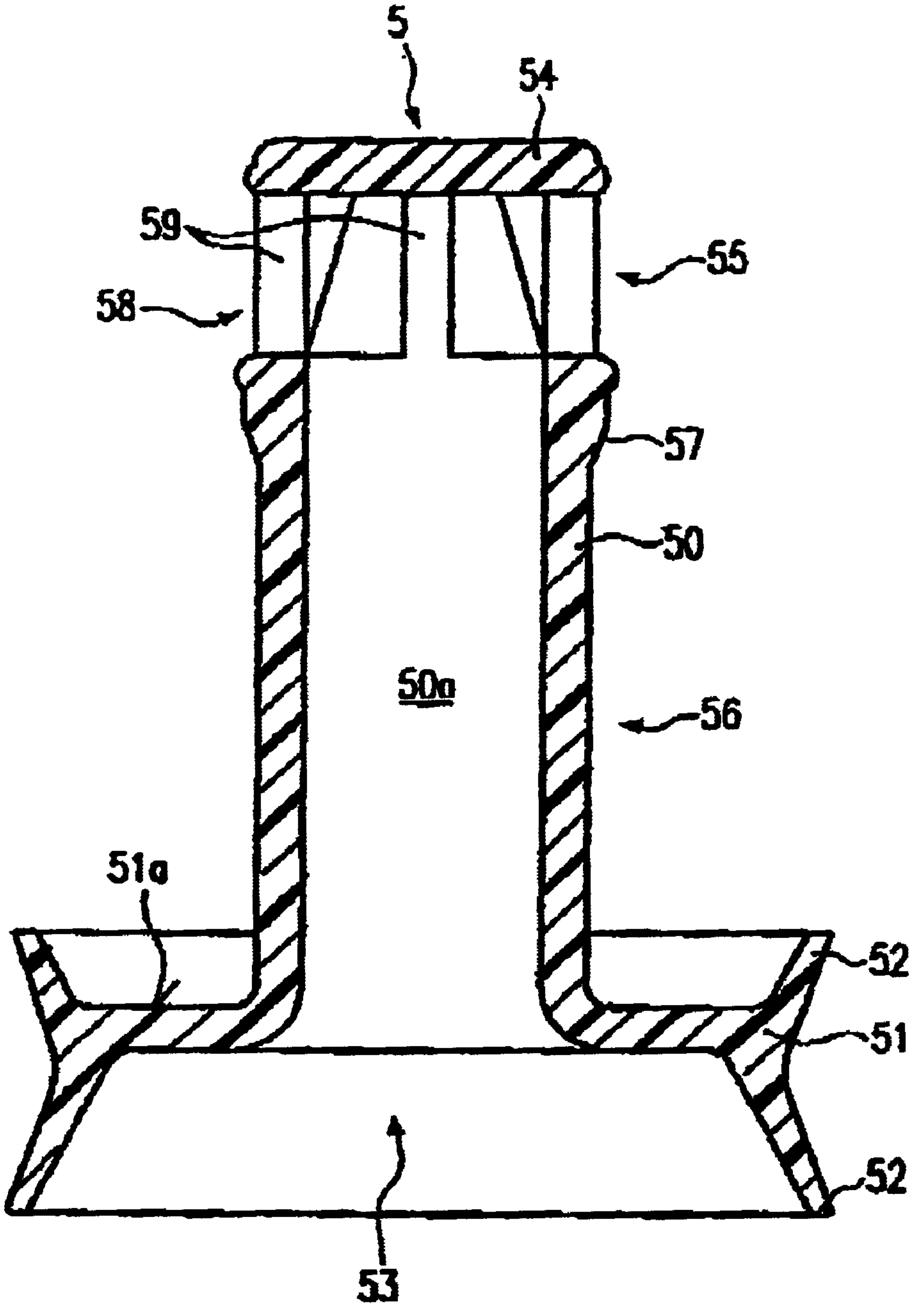
FIG. 3 is a longitudinal sectional view of the pressure piston of the embodiment shown in FIG. 1.

FIG. 3 shows details of the pressure piston 5 in more detail. Said piston comprises a substantially cylindrical, internally hollow delivery shaft 50 whose one end has integrally formed thereon a delivery piston 51. The delivery piston 51 projects radially beyond the delivery shaft 50 and is equipped on its outer circumferential surface with upper and lower sealing lips 52 which project in axial direction beyond the delivery piston 51 of a substantially annular configuration. At the front side facing the delivery shaft 50, the delivery piston 51 forms an annular contact surface 51*a*.

The delivery shaft 50 is provided at its one end with a delivery channel inlet opening 53 that is recessed in the center of the annular delivery piston St At its other end the delivery shaft 50 is closed at the front side by a shaft cap 54. The shaft cap 54 covers a cylinder section 55 of the delivery shaft 50 that is larger m diameter than the remaining shaft portion 56. M entraining rim 57 which is inclined obliquely outwards is positioned between said shaft portion 56 and the cylinder section 55. A plurality of delivery channel outlet openings 58 are recessed in distributed fashion between the entraining rim 57 and the shaft cap 54 on the outer circumferential surface of the cylinder section 55. Holding webs 59 that carry the shaft cap 54 extend between the delivery channel outlet openings 58 in circumferential direction. The delivery channel inlet opening 53 communicates via a delivery channel 50*a* surrounded by the delivery shaft 50 with the delivery channel outlet openings 58 and forms a delivery passage for the paste-like substance that is free of non-return valves.

The delivery shaft 50 is provided at its one end with a delivery channel inlet opening 53 that is recessed in the center of the annular delivery piston 51. At its other end, the delivery shaft 50 is closed at the front side by a shaft cap 54. The shaft cap 54 covers a cylinder section 55 of the delivery shaft 50 that is larger in diameter than the remaining shaft portion 56. An entraining rim 57 which is inclined obliquely outwards is positioned between said shaft portion 56 and the cylinder section 55. A plurality of delivery channel outlet openings 58 are recessed in distributed fashion between the entraining rim 57 and the shaft cap 54 on the outer circumferential surface of the cylinder section 55. Holding webs 59 that carry the shaft cap 54 extend between the delivery channel outlet openings 58 in circumferential direction. The delivery channel inlet opening 53 communicates via a delivery channel 50*a* surrounded by the delivery shaft 50 with the delivery channel outlet openings 58 and forms a delivery passage for the paste-like substance that is free of non-return valves.

Figure 4:
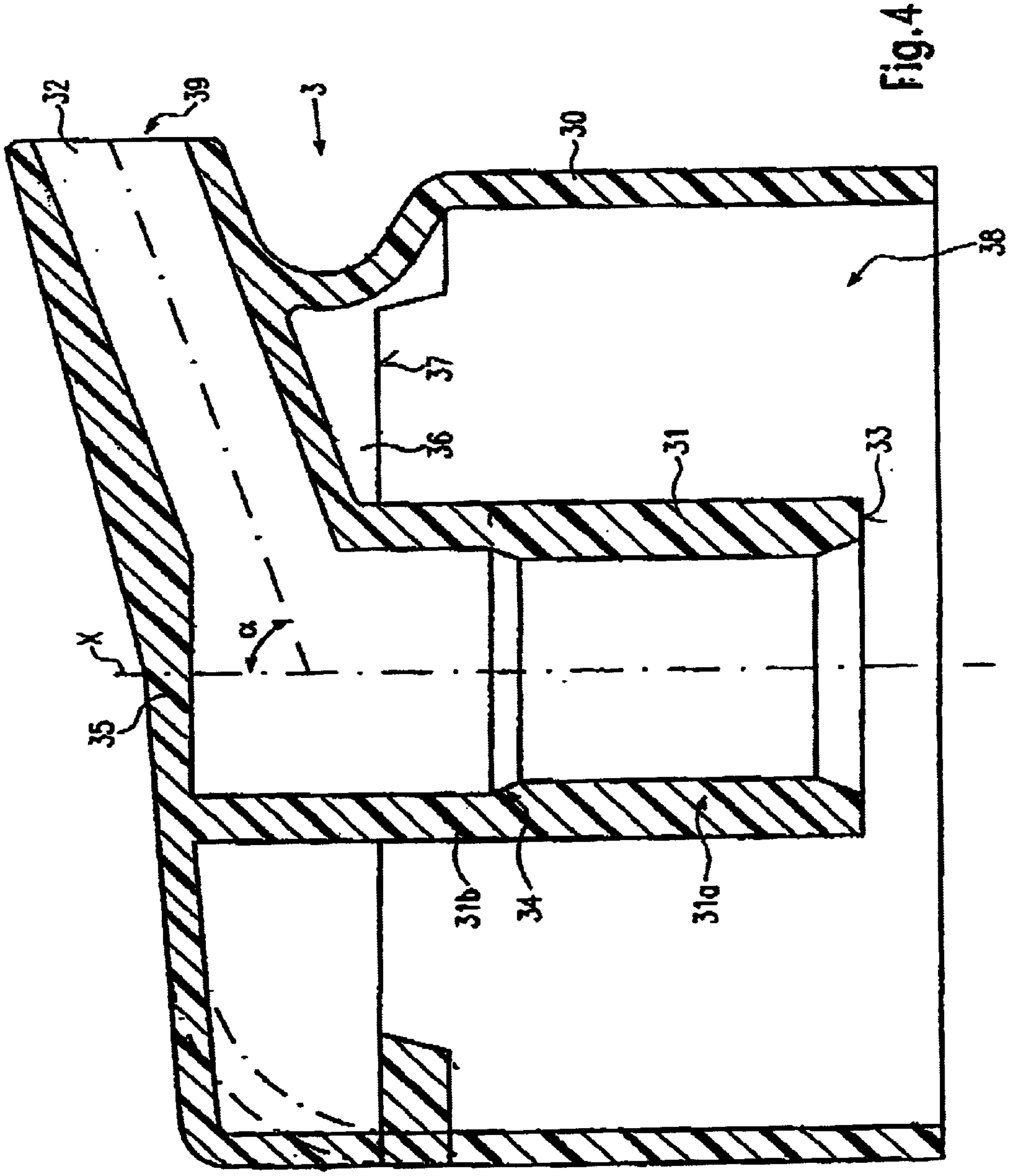
FIG. 4 is a longitudinal sectional view of the headpiece of the embodiment shown in FIG. 1.

FIG. 4 shows the headpiece 3 in a longitudinal sectional view. The headpiece 3 comprises a cylindrical outer casing 30 having concentrically arranged relative thereto an inner hollow guide bushing 31 which communicates with a discharge channel 32. The end of the guide bushing 32 at the front side forms a front-sided pressure surface 33 which the outer casing 30 projects over in axial direction. The guide bushing 31 is equipped in the vicinity of the pressure surface 33 at the front side with a first bushing section 31*a* having a smaller inner diameter than the second bushing section 31*b* positioned therebehind when viewed from the delivery direction of the paste-like substance. An entraining shoulder 34 is formed between the first and second bushing sections 31*a*; 31*b*, the entraining shoulder interconnecting the two sections of different bushing diameters via an inclined portion. The second bushing section 31*b* terminates in a discharge channel 32 laterally extending at an obtuse angle α from the central longitudinal axis X. The second bushing section 31*b* is defined at the upper side by a bushing head 35 which is at a right angle to the central longitudinal axis X and passes without any steps into the discharge channel 32.

In an extension approximately at a right angle relative to the central longitudinal axis X, the headpiece 3 comprises spring contact surfaces 37 formed on ribs 36. The ribs 36 extend approximately in star-shaped configuration from the bushing 31 to the inner surface of the outer casing 30. Accordingly, an annular chamber 38 which is open towards the bottom side of the headpiece 3 is formed between the inner surface of the outer casing 30, the outer surface of the guide bushing 31 and the spring contact surfaces 37.

The headpiece 3 is open towards the side of the outer casing 30 at the container side and formed above said front side substantially in the manner of a cap. A product discharge opening 39 of the discharge channel 32 is positioned on the upper side of the headpiece 3 which faces away from the front side of the outer casing 30.

Figure 5:
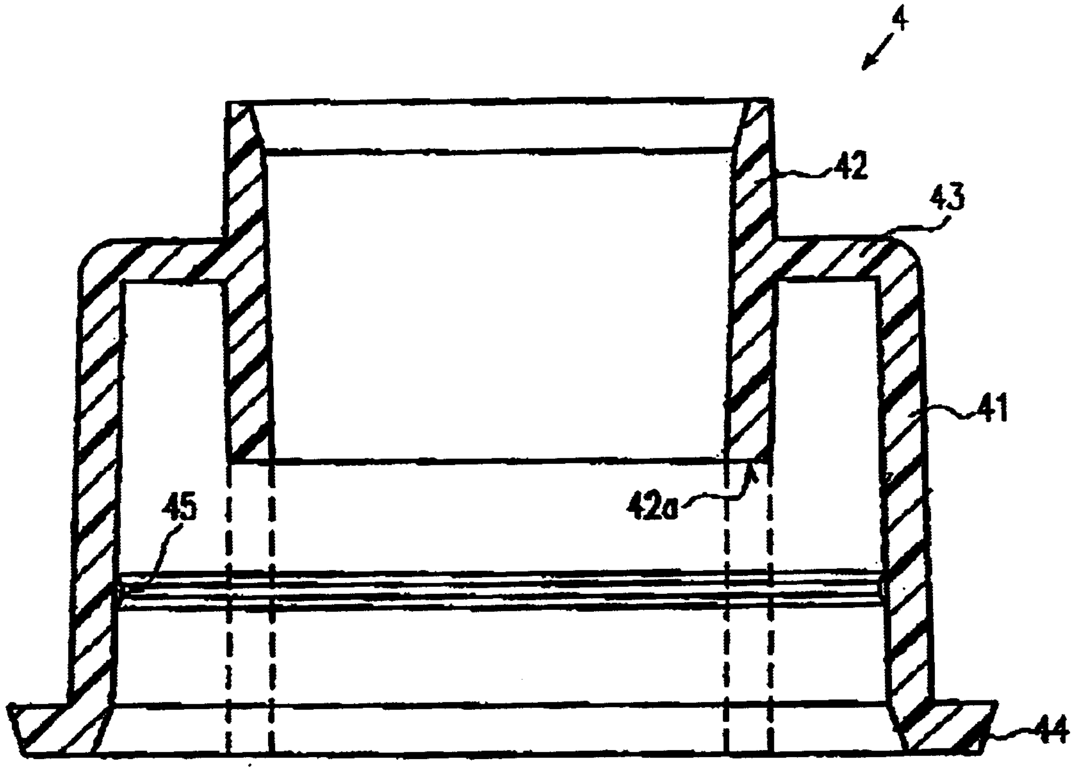
FIG. 5 is a longitudinal sectional view of the mating headpiece of the embodiment shown in FIG. 1.

FIG. 5 shows the mating headpiece 4 essentially comprising two concentric cylinder sections, namely an outer holding cylinder 41 and a guide cylinder 42 of a smaller diameter. The holding cylinder 41 projects beyond the guide cylinder 42 at the side facing the container 1, whereas the guide cylinder 42 projects beyond the holding cylinder 41 at the other side. At the front side of the holding cylinder 41 that faces away from the container 1, there is provided an annular web 43 which extends radially from there inwards and abuts approximately in the center on the outer surface of the guide cylinder 42.

The holding cylinder 41 is equipped at its front side at the container side with an outwardly projecting surrounding annular shoulder 44. A surrounding locking edge 45 is formed on the inner surface of the holding cylinder 41. The front side of the guide cylinder 42 at the container side forms a delivery piston stop 42*a*.

In the assembled state (cf. FIG. 1), the delivery piston 51 of the pressure piston 5 is slidingly positioned in the inner sleeve 13 of the container 1, thereby covering the delivery chamber 100 at the front side. The mating headpiece 4 is arranged concentric to the inner sleeve 13 and is pushed with its holding cylinder 41 in the manner of a cup over the inner sleeve 13. The annular shoulder 44 of the mating headpiece 4 rests on the front side of the cover 10 facing away from the container 1. The locking edge 45 which is formed on the inside of the holding cylinder 41 is in engagement with the locking groove 14 formed on the outside of the inner sleeve 13.

The annular shoulder 44 of the mating headpiece 4 is approximately positioned in the area of the inner sleeve 13 at the front side. The guide cylinder 42 radially adjoining the latter inwards surrounds the front-sided end of the guide bushing 31 of the headpiece 3 in the initial position shown in FIG. 1. Radially inside said guide bushing 31 is positioned the delivery shaft 50 with its shaft portion 56 of a smaller diameter. The delivery piston 51 of the pressure piston 5 is slidingly arranged on the inner wall of the inner sleeve 13. The annular contact surface 51*a* of the delivery piston 51 rests at the front side on the delivery piston stop 42*a* of the guide cylinder 42. As a result, the biasing force exerted by the spring 7 on the headpiece 3 is maintained and biases the pressure piston 5 in a direction away from the container 1 via contact of entraining shoulder 34 and entraining rim 57.

The delivery chamber 100 and the inner chamber 12 of the container 1 have positioned thereinbetween a container valve 20 formed in a known manner, which abuts with its sealing ring 21 on the annular rim 15 of cover 10 and seals the inner chamber 10*a* relative to the delivery chamber 100.

Figure 6A:
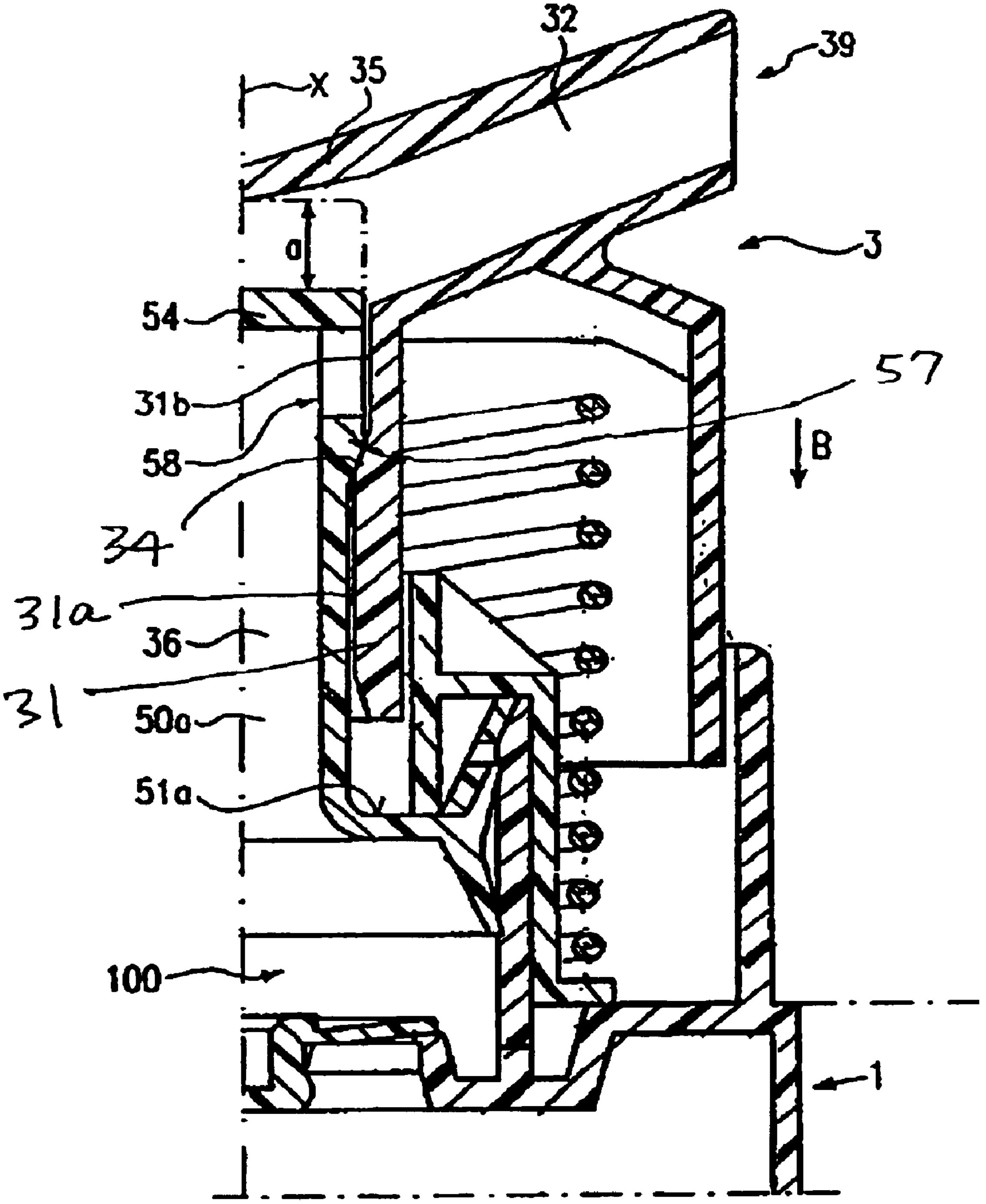
FIGS. 6*a–d* are longitudinal sectional views according to FIG. 1 upon operation of the embodiment shown in FIG. 1.

FIGS. 6*a* to 6*d* show the embodiment described with reference to the preceding figures when said embodiment is in use. FIG. 6*a* shows the initial position 0 described above with reference to FIG. 1. In said position, the delivery channel outlet openings 58 are circumferentially covered by the second bushing section 31*b*. The shaft cap 54 extends the discharge channel 32 beyond the central longitudinal axis X. The shaft cap 54 has a distance "a" from the inside of the bushing head 35.

Figure 6B:
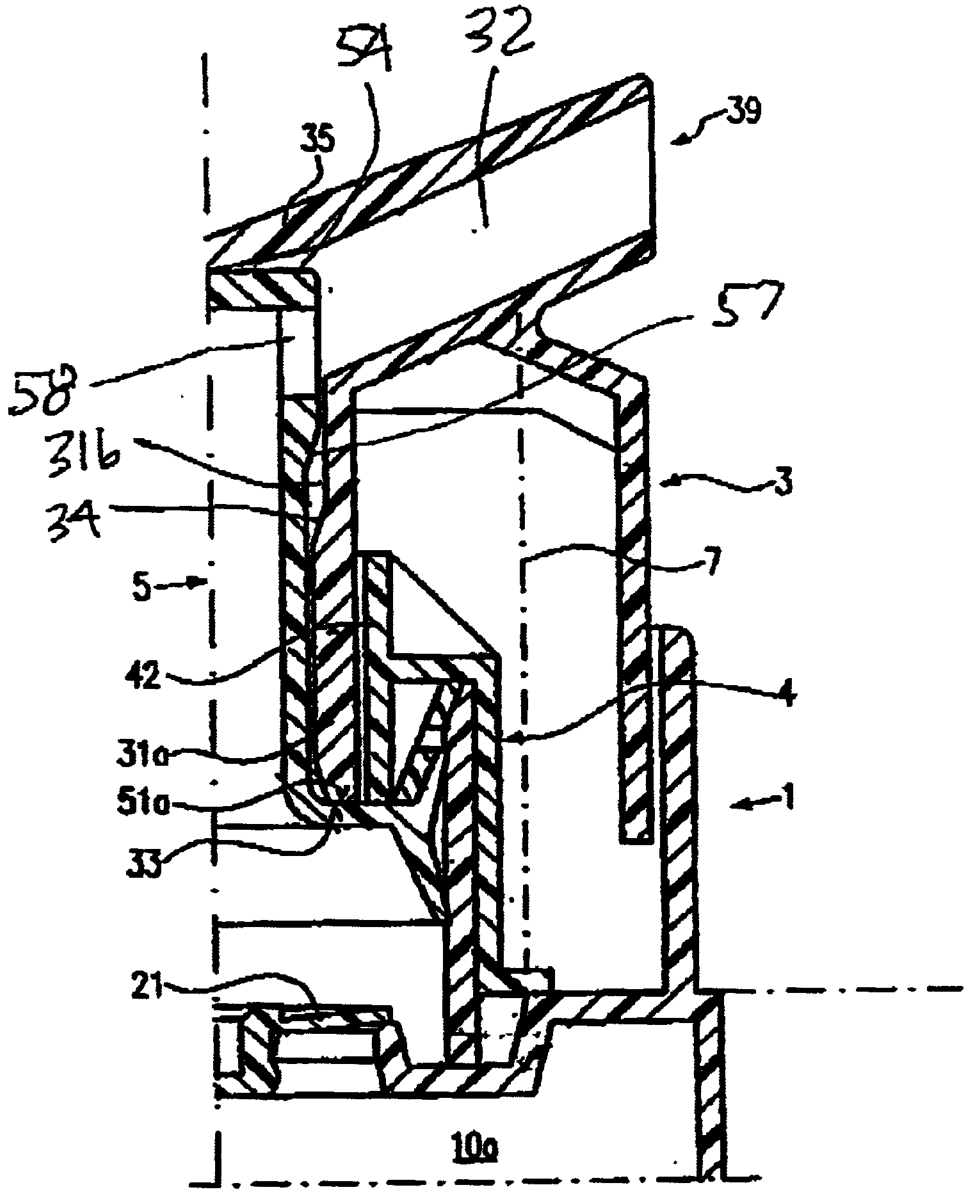
Figure 6C:
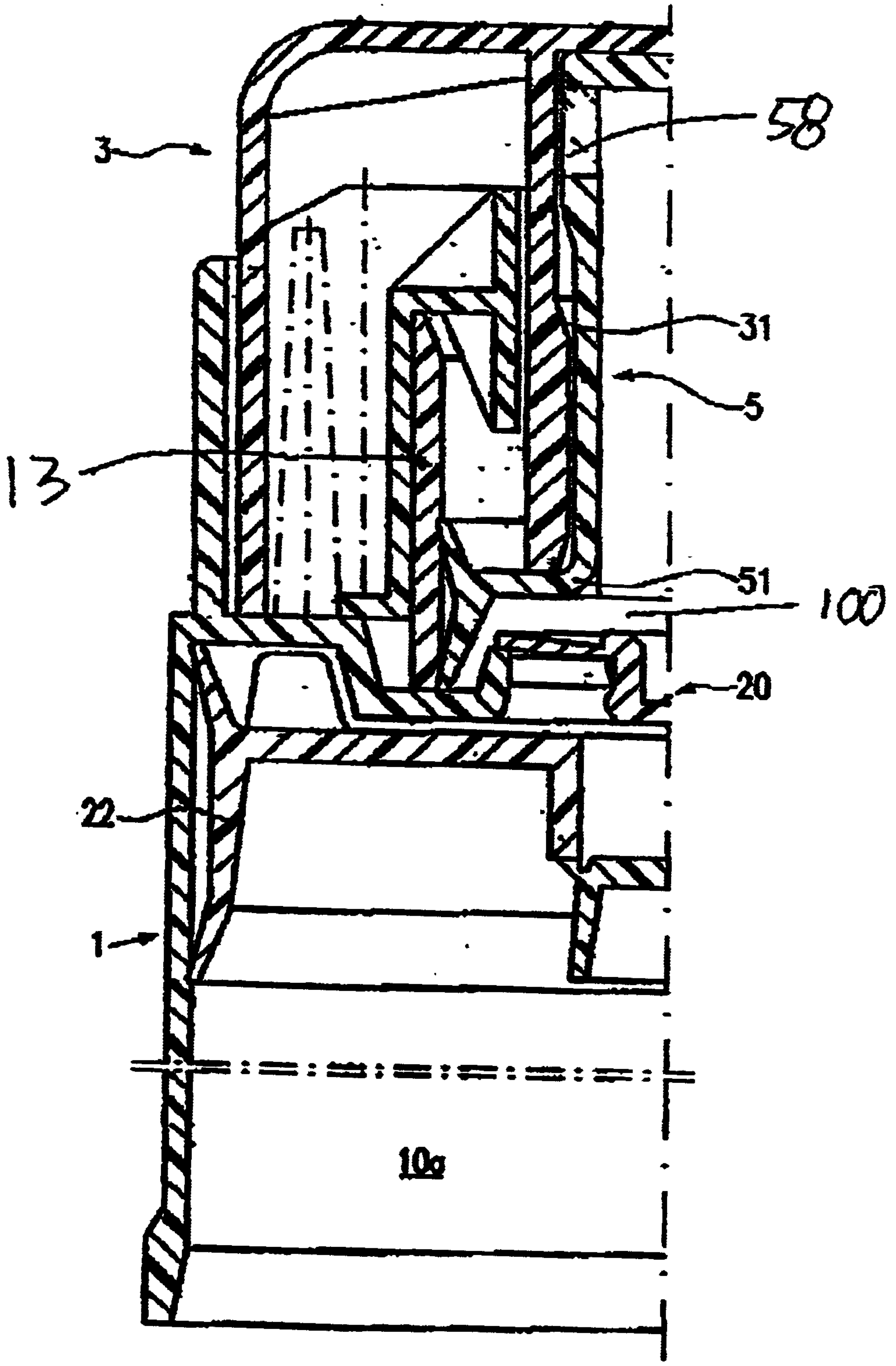
Figure 6D:
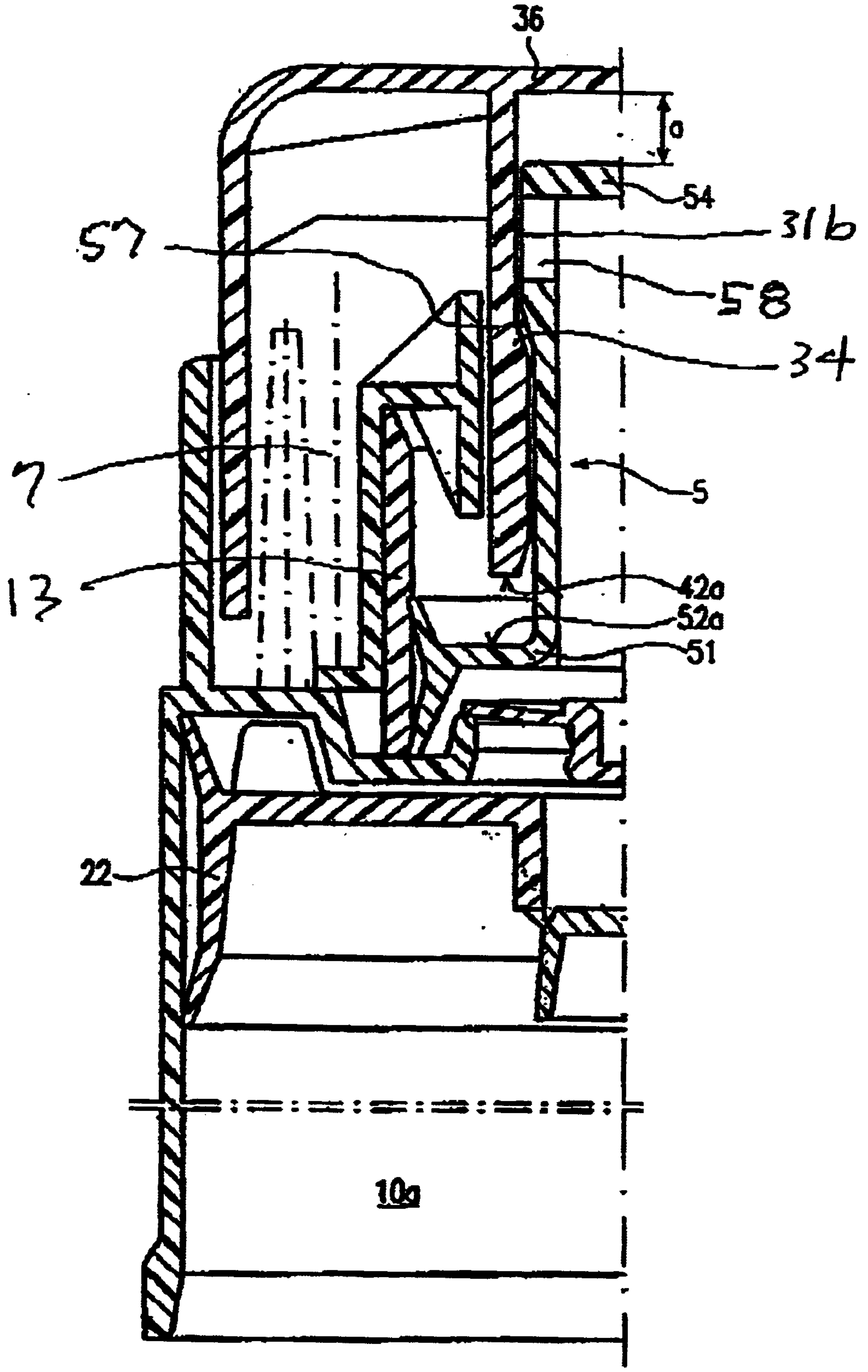

When using the dispenser, a user presses the headpiece 3 towards the container 1, i.e. in the direction of arrow B according to the illustration in FIG. 6*a*. Due to the incompressibility of the substance contained in the delivery chamber 100 and the delivery channel 50*a*, the pressure piston 5 remains in its position. The headpiece 3 moves relative to the pressure piston 5 towards the container 1. The positive contact between the entraining rim 57 and the entraining shoulder 34 is released until the shaft cap 54 abuts on the inner surface of the bushing head 35 or, depending on the design, the front-side pressure surface 33 at the end of the guide bushing 31 comes into contact with the annular contact surface 51*a* of the delivery piston 51 (central position M). After this axial displacement by displacement distance "a", the delivery channel outlet openings 53 are exposed in the discharge channel 32 (FIG. 6*b*).

The headpiece 3 is slidingly guided with this type of movement and also with every other axial relative movement between the headpiece 3 and the mating headpiece 4 and between the headpiece 3 and the container 1, respectively, by contact of the outer circumferential surface of the guide bushing 31 on the inner circumferential surface of the guide cylinder 42. The relative movement between the headpiece 3 and the pressure piston 5 is carried out via contact of the circumferential surface of the second shaft section 31*a* on the shaft portion 56.

With a progressive pressure movement of the headpiece 3 towards the container 1 the pressure piston 5 is entrained This reduces the volume of the delivery chamber 100, so that the paste-like product positioned in the delivery direction behind the container valve 21 is discharged via the delivery channel outlet opening 53 into the discharge channel 32. The paste-like product leaves the discharge channel via the product discharge opening 39 thereof At the end of said relative movement of the headpiece 3 towards the container 1, the sealing lips 52 of the pressure piston 5 at the container side abut on the front side of the annular gap 16. In this discharge end position V, the delivery chamber 100 has reached its minimum volume (cf. FIG. 6*c*).

When the headpiece 3 is now released by the user, the coil spring 7 presses the headpiece 3 back in the opposite direction. In this process, the pressure piston 5 first remains in its discharge end position V. It is just the headpiece 3 that moves away from the container 1, namely for such a long time until the entraining shoulder 34 comes to rest on the entraining rim 57 (cf. FIG. 6*d*).

During this axial displacement by distance "a", the paste-like product contained in the discharge channel 32 is pulled back into the chamber formed thereby between the shaft cap 54 and the inside of the bushing head 35. At the end of said displacement movement, the paste-like product will then no longer directly rest on the product discharge opening 39 of the discharge channel 32, whereby it is prevented that paste-like product drips at the end of the delivery process out of the discharge channel 32 or is impaired by soiling in the area of the product discharge opening 39.

After displacement by distance "a" and contact of entraining rim 57 and entraining shoulder 34 (FIG. 6*d*), the pressure piston 5 is also returned with a progressive movement of the headpiece 3 towards the initial position, which will be reached when the delivery piston stop 42*a* rests on the annular contact surface 51*a* of the delivery piston 51. During the relative movement of the pressure piston 5 away from the container 1, paste-like product is delivered from the inner chamber 10*a* of the container 1 through the container opening 11 into the delivery chamber 100. The relative vacuum created in this process in the inner chamber 10*a* leads in a manner known per se to a follow-up movement of the follower piston 22, which is positioned in the inner chamber 12.

Figure 7:
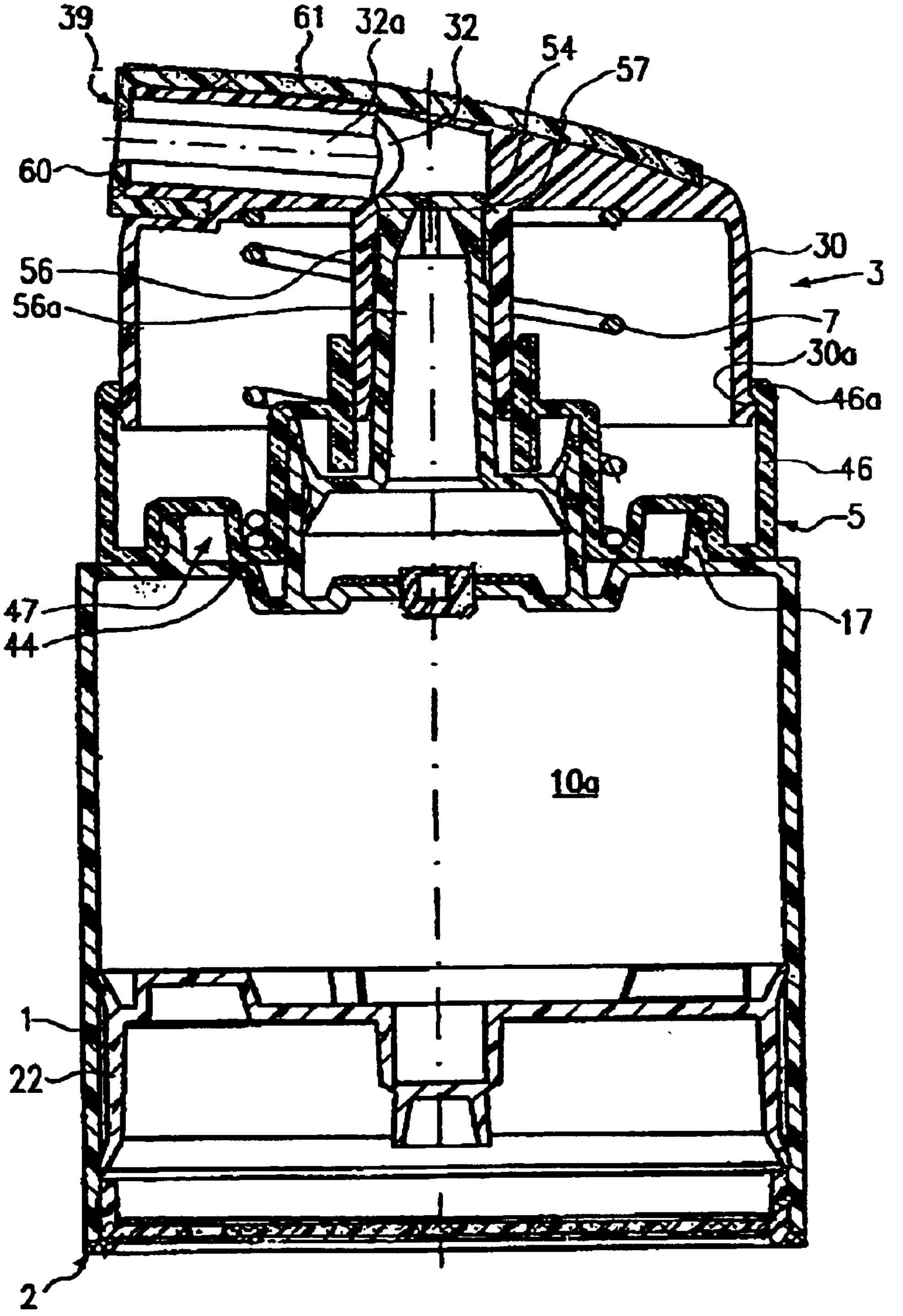
FIG. 7 is a longitudinal sectional view of a second embodiment of the dispenser according to the invention.

FIG. 7 shows a second embodiment of the dispenser according to the invention. Like parts in this embodiment are designated with like reference numerals in comparison with the above-discussed embodiment. The container 1 of the embodiment shown in FIG. 7 is essentially identical with the container described above, comprising an outer container wall surrounding an inner chamber 10*a* in which a follower piston 22 is arranged in a longitudinally displaceable manner and which is closed by a bottom plate 2. In contrast to the previously described embodiment, the container 1 is equipped on its cover at the front side with a surrounding locking ring 17. The mating headpiece 4 is radially extended outwards via the annular shoulder 44 and has a cylindrical outer wall 46 which extends substantially in parallel with the holding cylinder 51 and has a diameter larger than the diameter of the outer casing 30 of the headpiece 3. A locking recess 47 is formed between the outer wall 46 and the holding cylinder 41 at the bottom side of the mating headpiece 4 at the container side and cooperates with the locking ring 17 for forming a locking connection between the headpiece 4 and the container 1.

In the embodiment shown in FIG. 7, the mating headpiece 4 is formed together with the headpiece 3 as a prefabricated dispenser component. The free end of the outer wall 46 of the mating headpiece 4 which faces away from the container 1 is radially bent inwards for forming a locking nose 46*a* and projects in axial direction over an annular bead 30*a* which is provided on the outside of the outer casing 30 on the headpiece 3. This forms a stop by which the mating headpiece 4 is captively connected to the headpiece 3. Said stop holds the spring forces applied by spring 7. The dispenser component surrounding the headpiece 3 and the mating headpiece 4 can thus be preassembled prior to assembly on the container 1. To this end the spring 7 is inserted into the cavity between the headpiece 3 and the mating headpiece 4. The two components 3, 4 are slid into one another in axial direction to such an extent that the annular bead 30*a* slides past the inwardly bent end of the outer wall 46.

In the embodiment shown in FIG. 7, the pressure piston 5 comprises an entraining rim 57 which is formed on the shaft cap 54. As a consequence, the entraining rim 57 seals the discharge channel 32 in the initial position shown in FIG. 7. The entraining shoulder 34 is formed in the illustrated embodiment via a surrounding shoulder bead 34*a* on the guide bushing. The delivery shaft 50 has a shaft portion 56 of a reduced diameter, the longitudinal extension of which corresponds to the axial distance "a". The axial displaceability of the pressure piston 5 relative to the headpiece 3 is thus defined by the shaft cap 54 on the one hand and by the longitudinal extension of the shaft portion 56 of a reduced diameter on the other end.

In the embodiment shown in FIG. 7, another difference over the above-mentioned first embodiment is that the discharge channel 32 has formed therein a closure mandrel 32*a* which is integrally formed on the headpiece 3. The product discharge opening 39 is ring-like due to the closure mandrel 32*a*. The product discharge opening 39 is covered in the illustrated embodiment by an annular closure member 60 which is connected as a separate component of a thermoplastic elastomer to the headpiece 3. The closure member 60 in the initial position shown in FIG. 7 rests on the outer circumferential surface and on parts of the front side, but particularly on the circumferential surface of the closure mandrel 32*a*, thereby sealing the discharge channel 32. Integral with the closure member 60 is a coating 61 which is of the same material as the closure member 60 and which extends over the greatest part of the cover of the headpiece 3 at the front side. A non-slip functional surface is formed on the headpiece 3 thanks to this coating.

Upon operation of the dispenser shown in FIG. 7, the processes explained above particularly with reference to FIGS. 6*a–d* take place. However, in contrast with the above-mentioned embodiment, the discharge channel is here sealed relative to the environment during resetting of pressure piston 5 and headpiece 3. Upon a relative movement of the pressure piston 5 relative to the headpiece 3 towards the container 1, the product contained in the discharge channel 32 is pulled back, as has already mentioned above, in a direction opposite to the delivery direction into the interior of the headpiece 3. In the embodiment shown in FIG. 7, the pressure gradient created thereby between the atmosphere and the discharge channel 32 effects a completely tight contact of the closure member 60 on the surfaces of the closure mandrel 32*a*. As a consequence, paste-like product contained in the discharge channel 32 remains almost unaffected by possible oxidation processes. The shaft cap 54 additionally seals the delivery channel 50*a* with respect to the discharge channel 32, so that an impairment of the paste-like product inside the delivery channel 50*a* by air that might enter into the discharge channel 32 is avoided at any rate.

The above-described two embodiments have the advantage in common that the delivery channel openings 58 will only be exposed in the delivery channel 32 after a relative movement between the headpiece 3 and the pressure piston 5. For a delivery of the paste-like product from the delivery chamber towards the product discharge opening 32*a* it is not necessary that the internal pressure first built up in the delivery chamber 100 should be exploited for opening a non-return valve positioned therebehind in the direction of delivery. Accordingly, the paste-like product can be delivered by applying a small force. Furthermore, the two aforementioned embodiments offer the advantage that the paste-like product is pulled back in the discharge channel 32 in a direction opposite to the delivery direction upon actuation of the headpiece, with the embodiment shown in FIG. 7 offering the admissible advantage that due to the sealing contact of the closure member 60 on the closure mandrel 32*a* the paste-like product contained in the dispenser is reliably protected against impairment e.g. by oxygen in the air.

LIST OF REFERENCE NUMERALS

1 Container
2 Bottom plate
3 Headpiece
4 Mating headpiece
5 Pressure piston
6 Closure cap
7 Coil spring
10 Cover
10*a* Inner chamber
11 Container opening
11*a* Holding web
12 Outer sleeve
13 Inner sleeve
14 Locking groove
15 Annular rim
16 Annular gap
17 Locking ring
20 Container valve
21 Valve plate
22 Follower piston
30 Outer casing
30*a* Annular bead

31 Guide bushing
31*a* First bushing section
31*b* Second bushing section
32 Discharge channel
32*a* Closure mandrel
33 Pressure surface
34 Entraining shoulder
35 Bushing head
36 Rib
37 Spring contact surface
38 Annular chamber
39 Product discharge opening
41 Holding cylinder
42 Guide cylinder
42*a* Delivery piston stop
43 Annular web
44 Annular shoulder
45 Locking edge
46 Outer wall
46*a* Locking nose
47 Locking recess
50 Delivery shaft
50*a* Delivery channel
51 Delivery piston
51*a* Contact surface
52 Sealing lips
53 Delivery channel inlet opening
54 Shaft cap
55 Cylinder section
56 Shaft portion
57 Entraining rim
58 Delivery channel outlet opening
59 Holding web
60 Closure member
61 Coating

What is claimed is:

1. A dispenser for dispensing a paste-like product, comprising:

component and is fastened at the front side to the container (1).

2. The dispenser according to claim 1, characterized in that the headpiece bushing means includes a lower second bushing surface portion (31*a*) which guides the delivery piston in a longitudinally displaceable manner and which comprises at least one guide surface cooperating with the circumferential surface of the delivery piston.

3. The dispenser according to claim 1, characterized in that the headpiece (3) and the delivery piston have provided thereon entraining means (34, 57) by which the delivery piston is entrained after manual operation during resetting of the headpiece (3) into the initial first position.

4. The dispenser according to claim 3, characterized in that said entraining means includes an entraining shoulder (67) which cooperates with an entraining rim (34) formed on the delivery piston.

5. The dispenser according to claim 4, characterized in that the entraining shoulder (34) is provided at the end side on the bushing means (31) at the transition to the discharge channel (32), and the entraining rim (57) is provided in the end portion of the delivery shaft (50) at the front side.

6. The dispenser according to claim 1, characterized in that the delivery piston (51) projects radially outwardly to define an annular contact surface (51*a*), and that the guide bushing means (31) has a pressure end surface (33) that is arranged in the initial position at said given axial distance relative to the annular contact surface (51*a*) and is positioned by axial displacement of the headpiece (3) toward the container (1) on the annular contact surfaces (51*a*).

7. The dispenser according to claim 1, characterized in that the inner wall of the delivery chamber (100) is formed by the inner sleeve portion (13) of the container (1) adjacent the headpiece (3).

8. The dispenser according to claim 1, characterized in that the headpiece (3) is longitudinally displaceable such that the headpiece (10) can be brought by manual operation from the initial position first by a first axial distance (a) for contact with the delivery piston with simultaneous exposure of the delivery channel outlet opening (58) in the discharge channel (32) into a central position (M) and the headpiece (3) can then be brought with a progressive axial displacement with entrainment of the delivery piston (51) from the central position (M) into a discharge end position (V) in which the delivery chamber (100) has reached a minimum volume by displacement of the delivery piston (51).

9. The dispenser according to claim 1, characterized by a closure member (60) which is fixed to the headpiece and by which a product discharge opening (39) of the discharge channel (32) can be closed.

10. The dispenser according to claim 9, characterized in that the product discharge opening (39) is formed as a ring around a closure mandrel (32*a*) arranged in the discharge channel, and that the closure member (60) has an annularly formed sealing lip which can sealingly be placed on the closure mandrel.

11. The dispenser according to claim 9, characterized in that the closure member (60) is made from a flexible plastic material, preferably from a thermoplastic elastomer.

12. The dispenser according to claim 9, characterized in that the closure (a) a generally cylindrical hollow container (1) having a vertical longitudinal axis (X) and upper and lower ends, said container including intermediate its ends a transverse wall (10) that defines in said container a lower chamber (10*a*) for receiving the paste-like product, and an upper delivery chamber (100) having a cylindrical wall defined on an inner sleeve portion (13) of said container, said lower chamber containing a vertically displaceable follower piston (22) said transverse wall containing a discharge opening (11) containing valve means (20) that permit the flow of a variable volume of the paste-like product from said lower chamber to said upper delivery chamber when the pressure of said lower chamber exceeds that of said upper chamber;

(b) a generally cylindrical main headpiece (3) arranged above said transverse wall for vertical displacement relative to said container, said headpiece having upper and lower ends, said lower end containing an internal chamber having a top wall (35), said internal chamber having an inner cylindrical side wall that defines bushing means (31), said headpiece containing at said upper end a laterally extending product discharge channel (32) in communication with said internal chamber;

(c) a generally cylindrical vertically arranged delivery piston (5) arranged for vertical sliding movement relative to said container, said piston having an upper end (50) that extends within said headpiece internal chamber and terminates in an upper end wall (54), said piston having a lower end (52) that is in sliding engagement with said delivery chamber cylindrical wall, said piston containing a vertical longitudinal delivery channel (50*a*) having a lower end containing an inlet opening (53) in communication with said delivery chamber, said delivery piston upper end containing at least one radial outlet opening (58) in communication with said longitudinal delivery channel; and (d) spring means (7) biasing said headpiece upwardly toward a first position relative to said container;

(e) said delivery piston having a first position relative to said container such that when said main headpiece is in said first position, the upper end of said delivery piston is spaced by a given axial distance (a) from said main headpiece upper wall, and said delivery piston outlet opening is closed by an upper first surface portion (31*b*) of said bushing means;

(f) said main headpiece being longitudinally displaceable downwardly relative to said container and said piston toward a second position in which said headpiece top wall engages said piston upper wall, and said bushing means first surface portion is displaced to an open position relative to said delivery piston outlet opening;

(g) said headpiece being downwardly displaceable from said second position toward a third position relative to said container, thereby causing said piston to be displaced by said headpiece to a second position relative to said container, whereby the pasty-like product is pumped from said delivery chamber to said product discharge channel via said piston longitudinal discharge channel and said piston outlet opening.

13. A dispenser for dispensing a paste-like product, comprising:

(a) a generally cylindrical hollow container (1) having a vertical longitudinal axis (X) and upper and lower ends, said container including intermediate said ends a transverse wall (10) that defines in said container a lower chamber (10*a*) for receiving the paste-like product, and an upper delivery chamber (100) having a cylindrical wall defined on an inner sleeve portion (13) of said container, said lower chamber containing vertically displaceable a follower piston (22), said transverse wall containing a discharge opening (11) containing valve means (20) that permit the flow of a variable volume of the paste-like product from said lower chamber to said upper delivery chamber when the pressure of said lower chamber exceeds that of said upper delivery chamber;

(b) a generally cylindrical main headpiece (3) arranged above said transverse wall for vertical displacement relative to said container, said headpiece having upper and lower ends, said lower end containing an internal chamber having in a top wall (35), said internal chamber having an inner cylindrical side wall that defines bushing means (31), said headpiece containing at said upper end a laterally extending product discharge channel (32) in communication with said internal chamber;

(c) a generally cylindrical vertically arranged delivery piston (5) arranged for vertical sliding movement relative to said container, said piston having an upper end (50) that extends within said headpiece internal chamber and terminates in an upper end wall (54), said piston having a lower end (52) that is in sliding engagement with said delivery chamber cylindrical wall, said piston containing a vertical longitudinal delivery channel (50*a*) having a lower end containing an inlet opening (53) in communication with said delivery chamber, said delivery piston upper end containing at least one radial outlet opening (58) in communication with said longitudinal delivery channel;

(d) spring means (7) biasing said headpiece upwardly toward a first position relative to said container;

(e) said delivery piston having a first position relative to said container such that when said main headpiece is in said first position, the upper end of said delivery piston is spaced by a given axial distance (a) from said main headpiece upper wall, and said delivery piston outlet opening is closed by an upper first surface portion (31*b*) of said bushing means;

(f) said main headpiece being longitudinally displaceable downwardly relative to said container and said piston toward a second position in which said headpiece top wall engages said piston upper wall, and said bushing means first surface portion is displaced to an open position relative to said delivery piston outlet opening;

(g) said headpiece being downwardly displaceable from said second position toward a third position relative to said container, thereby causing said piston to be displaced by said headpiece to a second position relative to said container, whereby the pasty-like product is pumped from said delivery chamber to said product discharge channel via said piston longitudinal discharge channel and said piston outlet opening, and (h) a generally cylindrical mating headpiece (4) connected with said container for guiding said main headpiece, said mating member having an outer holding cylindrical portion (41) arranged concentrically about said container inner sleeve portion, and an inner tubular guide portion (42) arranged concentrically within said sleeve portion for guiding the sliding displacement of the headpiece (3).

14. The dispenser according to claim 13, characterized in that the end of the guide portion (42) at the delivery chamber cylindrical wall comprises a delivery piston stop (42*a*) for the delivery piston (5).

15. The dispenser according to claim 13, characterized in that the holding cylinder (41) is provided with an annular shoulder (44) at the bottom side which forms a contact surface for a coil spring holding the headpiece in the initial position under bias and is put on the front side of the container (1).

16. The dispenser according to claim 13, characterized in that the mating headpiece (4) comprises at least one stop (46*a*) for defining the axial displacement movement of the headpiece (3) and is formed together with the headpiece (3) as a prefabricated dispenser member (60) is integral with a coating (61) formed at least at the front side on the outside of the headpiece (3).

17. The dispenser according to claim 16, characterized in that the dispenser component is locked with the container (1) via locking means (47; 17) formed on the mating headpiece (4) and the front side of the container (1).

* * * * *

UNITED STATES PATENT AND TRADEMARK OFFICE

CERTIFICATE OF CORRECTION

PATENT NO. : 6,955,278 B2
APPLICATION NO. : 10/742899
DATED : October 18, 2005
INVENTOR(S) : Willy Lorscheidt It is certified that error appears in the above-identified patent and that said Letters Patent is hereby corrected as shown below:

1. A dispenser for dispensing a paste-like product, comprising:

(a) a generally cylindrical hollow container (1) having a vertical longitudinal axis (X) and upper and lower ends, said container including intermediate said ends a transverse wall (10) that defines in said container a lower chamber (10a) for receiving the paste-like product, and an upper delivery chamber (100) having a cylindrical wall defined on an inner sleeve portion (13) of said container, said lower chamber containing a vertically displacable follower piston (22), said transverse wall containing a discharge opening (11) containing valve means (20) that permit the flow of a variable volume of the paste-like product from said lower chamber to said upper delivery chamber when the pressure of said lower chamber exceeds that of said upper chamber;

(b) a generally cylindrical main headpiece (3) arranged above said transverse wall for vertical displacement relative to said container, said headpiece having upper and lower ends, said lower end containing an internal chamber having a top wall (35), said internal chamber having an inner cylindrical side wall that defines bushing means (31), said headpiece containing at said upper end a laterally extending product discharge channel (32) in communication with said internal chamber;

UNITED STATES PATENT AND TRADEMARK OFFICE
CERTIFICATE OF CORRECTION

PATENT NO. : 6,955,278 B2
APPLICATION NO. : 10/742899
DATED : October 18, 2005
INVENTOR(S) : Willy Lorscheidt It is certified that error appears in the above-identified patent and that said Letters Patent is hereby corrected as shown below:

(c) a generally cylindrical vertically arranged delivery piston (5) arranged for vertical sliding movement relative to said container, said piston having an upper end (50) that extends within said headpiece internal chamber and terminates in an upper end wall (54), said piston having a lower end (52) that is in sliding engagement with said delivery chamber cylindrical wall, said piston containing a vertical longitudinal delivery channel (50a) having a lower end containing an inlet opening (53) in communication with said delivery chamber, said delivery piston upper end containing at least one radial outlet opening (58) in communication with said longitudinal delivery channel; and (d) spring means (7) biasing said headpiece upwardly toward a first position relative to said container;

(e) said delivery piston having a first position relative to said container such that when said main headpiece is in said first position, the upper end of said delivery piston is spaced by a given axial distance (a) from said main headpiece upper wall, and said delivery piston outlet opening is closed by an upper first surface portion (31b) of said bushing means;

(f) said main headpiece being longitudinally displaceable downwardly relative to said container and said piston toward a second position in which said headpiece top wall engages said piston upper wall, and said bushing means first surface portion is displaced to an open position relative to said delivery piston outlet opening;

UNITED STATES PATENT AND TRADEMARK OFFICE
CERTIFICATE OF CORRECTION

PATENT NO. : 6,955,278 B2
APPLICATION NO. : 10/742899
DATED : October 18, 2005
INVENTOR(S) : Willy Lorscheidt It is certified that error appears in the above-identified patent and that said Letters Patent is hereby corrected as shown below:

(g) said headpiece being downwardly displaceable from said second position toward a third position relative to said container, thereby causing said piston to be displaced by said headpiece to a second position relative to said container, whereby the pasty-like product is pumped from said delivery chamnber to said product discharge channel via said piston longitudinal discharge channel and said piston outlet opening.

2. The dispenser according to claim 1, characterized in that the headpiece bushing means includes a lower second bushing surface portion (31a) which guides the delivery piston in a longitudinally displaceable manner and which comprises at least one guide surface cooperating with the circumferential surface of the delivery piston.

3. The dispenser according to claim 1, characterized in that the headpiece (3) and the delivery piston have provided thereon entraining means (34, 57) by which the delivery piston is entrained after manual operation during resetting of the headpiece (3) into the initial first position.

4. The dispenser according to claim 3, characterized in that said entraining means includes an entraining shoulder (67) which cooperates with an entraining rim (34) formed on the delivery piston.

5. The dispenser according to claim 4, characterized in that the entraining shoulder (34) is provided at the end side on the bushing means (31) at the transition to the discharge channel (32), and the entraining rim (57) is provided in the end portion of the delivery shaft (50) at the front side.

6. The dispenser according to claim 1, characterized in that the delivery piston (51) projects radially outwardly to define an annular contact surface (51a), and that the guide

UNITED STATES PATENT AND TRADEMARK OFFICE

CERTIFICATE OF CORRECTION

PATENT NO. : 6,955,278 B2 
APPLICATION NO. : 10/742899
DATED : October 18, 2005
INVENTOR(S) : Willy Lorscheidt It is certified that error appears in the above-identified patent and that said Letters Patent is hereby corrected as shown below:

bushing means (31) has a pressure end surface (33) that is arranged in the initial position at said given axial distance relative to the annular contact surface (51a) and is positioned by axial displacement of the headpiece (3) toward the container (1) on the annular contact surface (51a).

7. The dispenser according to claim 1, characterized in that the inner wall of the delivery chamber (100) is formed by the inner sleeve portion (13) of the container (1) adjacent the headpiece (3).

8. A dispenser for dispensing a paste-like product, comprising:

(a) a generally cylindrical hollow container (1) having a vertical longitudinal axis (X) and upper and lower ends, said container including intermediate said ends a transverse wall (10) that defines in said container a lower chamber (10a) for receiving the paste-like product, and an upper delivery chamber (100) haivng a cylindrical wall defined on an inner sleeve portion (13) of said container, said lower chamber containing a vertically displaceable follower piston (22), said transverse wall containing a discharge opening (11) containing valve means (20) that permit the flow of a variable volume of the paste-like product from said lower chamber to said upper delivery chamber when the pressure of said lower chamber exceeds that of said upper delivery chamber;

(b) a generally cylindrical main headpiece (3) arranged above said transverse wall for vertical displacement relative to said container, said headpiece having upper and lower ends, said lower end containing an internal chamber having a top wall (35), said internal chamber having an inner cylindrical side wall that defines bushing means (31), said headpiece containing at said upper end a laterally extending product discharge channel (32) in communication with said internal chamber;

CERTIFICATE OF CORRECTION

PATENT NO. : 6,955,278 B2 
APPLICATION NO. : 10/742899
DATED : October 18, 2005
INVENTOR(S) : Willy Lorscheidt It is certified that error appears in the above-identified patent and that said Letters Patent is hereby corrected as shown below:

(c) a generally cylindrical vertically arranged delivery piston (5) arranged for vertical sliding movement relative to said container, said piston having an upper end (50) that extends within said headpiece internal chamber and terminates in an upper end wall (54), said piston having a lower end (52) that is in sliding engagement with said delivery chamber cylindrical wall , said piston containing a vertical longitudinal delivery channel (50a) having a lower end containing an inlet opening (53) in communication with said delivery chamber, said delivery piston upper end containing at least one radial outlet opening (58) in communication with said longitudinal delivery channel;

(d) spring means (7) biasing said headpiece upwardly toward a first position relative to said container;

(e) said delivery piston having a first position relative to said container such that when said main headpiece is in said first position, the upper end of said delivery piston is spaced by a given axial distance (a) from said main headpiece upper wall, and said delivery piston outlet opening is closed by an upper first surface portion (31b) of said bushing means;

(f) said main headpiece being longitudinally displaceable downwardly relative to said container and said piston toward a second position in which said headpiece top wall engages said piston upper wall, and said bushing means first surface portion is displaced to an open position relative to said delivery piston outlet opening;

(g) said headpiece being downwardly displaceable from said second position toward a third position relative to said container, thereby causing said piston to be displaced by said headpiece to a second position relative to said container, whereby the pasty-like product is pumped from said delivery chamber to said product discharge channel via said piston longitudinal discharge channel and said piston outlet opening, and (h) a generally cylindrical mating headpiece (4) connected with said container for guiding said main headpiece, said mating member having an outer holding cylindrical portion (41) arranged concentrically about said container inner sleeve portion, and an inner tubular guide portion (42) arranged concentrically within said sleeve portion for guiding the sliding displacement of the headpiece (3).

9. The dispenser according to claim 8, characterized in that the end of the guide portion (42) at the delivery chamber cylindrical wall comprises a delivery piston stop (42a) for the delivery piston (5).

10. The dispenser according to claim 8, characterized in that the holding cylinder (41) is provided with an annular shoulder (44) at the bottom side which forms a contact surface for a coil spring holding the headpiece in the initial position under bias and is put on the front side of the container (1).

11. The dispenser according to claim 8, characterized in that the mating headpiece (4) comprises at least one stop (46a) for defining the axial displacement movement of the headpiece (3) and is formed together with the headpiece (3) as a prefabricated dispenser component and is fastened at the front side to the container (1).

12. The dispenser according to claim 11, characterized in that the dispenser component is locked with the container (1) via locking means (47; 17) formed on the mating headpiece (4) and the front side of the container (1).

13. The dispenser according to claim 1, characterized in that the headpiece (3) is longitudinally displaceable such that the headpiece (10) can be brought by manual operation from the initial position first by a first axial distance (a) for contact with the delivery piston with simultaneous exposure of the delivery channel outlet opening (58) in the discharge channel (32) into a central position (M) and the headpiece (3) can then be brought with a progressive axial displacement with entrainment of the delivery piston (51) from the central position (M) into a discharge end position (V) in which the delivery chamber (100) has reached a minimum volume by displacement of the delivery piston (51).

14. The dispenser according to claim 1, characterized by a closure member (60) which is fixed to the headpiece and by which a product discharge opening (39) of the discharge channel (32) can be closed.

15. The dispenser according to claim 14, characterized in the product discharge opening (39) is formed as a ring around a closure mandrel (32a) arranged in the discharge channel, and that the closure member (60) has an annularly formed sealing lip which can sealingly be placed on the closure mandrel.

16. The dispenser according to claim 14, characterized in that the closure member (60) is made from a flexible plastic material, preferably from a thermoplastic elastomer.

UNITED STATES PATENT AND TRADEMARK OFFICE

CERTIFICATE OF CORRECTION

PATENT NO. : 6,955,278 B2
APPLICATION NO. : 10/742899
DATED : October 18, 2005
INVENTOR(S) : Willy Lorscheidt It is certified that error appears in the above-identified patent and that said Letters Patent is hereby corrected as shown below:

17. The dispenser according to claim 14, characterized in that the closure member (60) is integral with a coating (61) formed at least at the front side on the outside of the headpiece (3).

Signed and Sealed this

Twelfth Day of September, 2006

Jon W. Dudas

JON W. DUDAS
*Director of the United States Patent and Trademark Office*